United States Patent [19]

Viklund

[11] Patent Number: 4,618,064
[45] Date of Patent: Oct. 21, 1986

[54] DEVICE FOR LOCKING A BEAM TO AN UPRIGHT, FOR EXAMPLE IN A PALLET RACK

[75] Inventor: Ake E. Viklund, Säffle, Sweden

[73] Assignee: Electrolux Constructor Aktiebolag, Saffle, Sweden

[21] Appl. No.: 595,602

[22] Filed: Apr. 2, 1984

[30] Foreign Application Priority Data

Apr. 15, 1983 [SE] Sweden ............................ 8302115

[51] Int. Cl.⁴ .............................................. A47F 5/00
[52] U.S. Cl. ................................. 211/192; 248/221.3; 248/222.1; 403/254; 403/316
[58] Field of Search ................. 211/192, 191, 187; 248/221.3, 222.1; 403/316, 317, 319, 254

[56] References Cited

U.S. PATENT DOCUMENTS

| | | | |
|---|---|---|---|
| 3,414,224 | 12/1968 | Robilliard et al. | 211/192 X |
| 3,612,290 | 10/1971 | Evans | 211/192 |
| 3,697,034 | 10/1972 | Shell | 248/221.3 X |
| 3,881,829 | 5/1975 | James | 211/192 X |
| 4,222,542 | 9/1980 | Wilson et al. | 248/221.3 X |

FOREIGN PATENT DOCUMENTS 844989 of 1970 Canada ............................ 211/192

Primary Examiner—Robert W. Gibson, Jr.
Attorney, Agent, or Firm—Alfred E. Miller

[57] ABSTRACT

A device for locking a beam to an upright column. The beam is provided with hooks adapted to be inserted into holes in the upright column and to be locked by a member which is a part of a spring-activated lock device. The lock device can be extracted and moved to a position in which a first stop surface of the device rests on the outside of the beam below the hole. When the lock device is moved to a position such that a second stop surface of the lock device upon insertion of the beam into an upright moves the member to a locking position of the beam to the column.

7 Claims, 5 Drawing Figures

DEVICE FOR LOCKING A BEAM TO AN UPRIGHT, FOR EXAMPLE IN A PALLET RACK

This invention relates to a device for locking a beam to an upright, for example in a pallet rack. The beam is provided on one hand with a hook or hooks, which are designed to be inserted through corresponding holes in the upright, and on the other hand having a spring-activated lock device. The lock device has a member by which it can be moved to an extracted position against the action of the spring, and which lock device can be acted upon manually so that a first stop surface of the device, at least during the initial part of the lifting movement performed when the beam is to be removed, is in engagement with the upright, which in turn retains the device in the extracted position.

Devices of the above type are known. In these devices it is possible to unhook one end of the beam from the holes in the upright when the lock device is pulled out by one hand, and then to repeat the procedure at the other end of the beam. Thereafter the beam is inserted into other holes and the lock device springs automatically into the free space in the hole above the hook, when the beam is pressed downwards in the hole. These devices, however, have the drawback that it can be difficult to remove a mounted beam, particularly if it is a long beam and only one person is available to perform the operation. This is due to the fact that for removing the beams the lock devices have to be acted upon simultaneously at both ends of the beam. Therefore, as a rule the operation is performed by two persons in which each one releases and unhooks one end of the beam.

An object of the invention is to provide a lock device which makes it possible to release one end of a beam separately, so that the beam can be unhooked from the upright without particular attention having to be paid to the ends of the beam. Furthermore, the lock device is of such a design that after removal of the beam the hooks can be inserted into the holes of the uprights, and the locking procedure can be automatically effected.

Another object of the invention is to provide a device in which the lock device is an integrated part of the beam and to eliminates the need for additional tools or loose details for mounting of the parts.

In order that the invention will be more clearly understood, it will now be disclosed in greater detail with reference to the accompanying drawings, in which.

Figure 1:
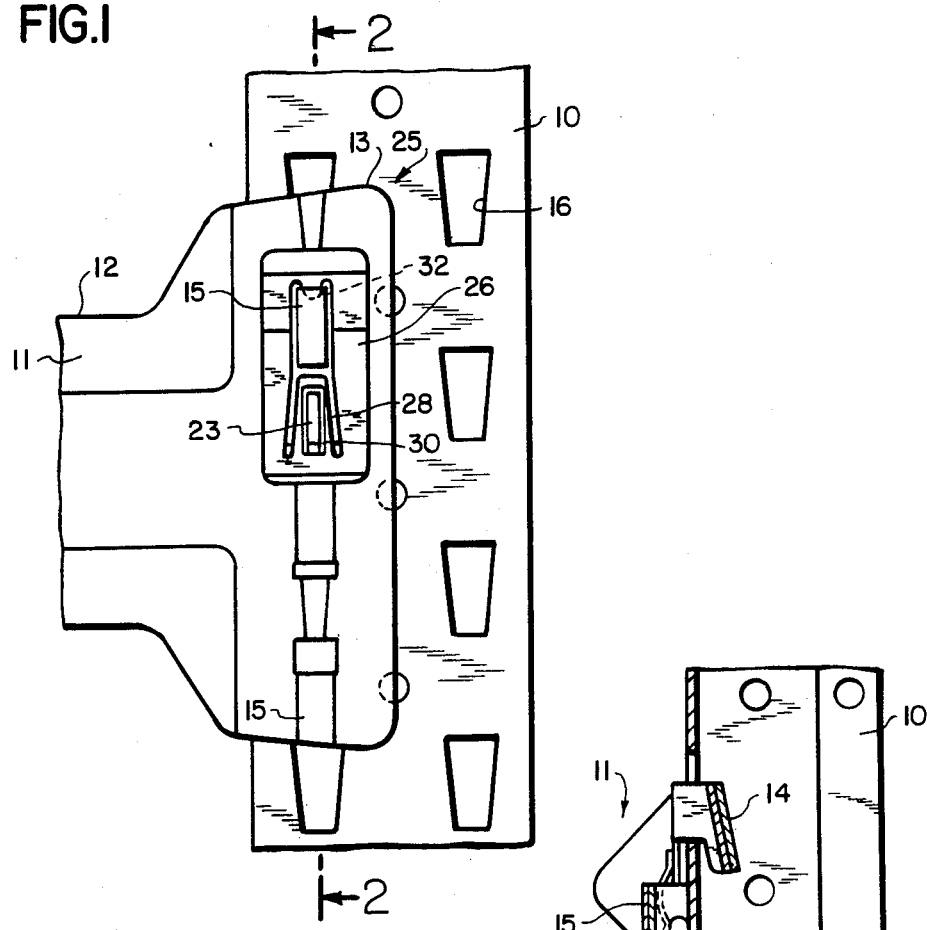
FIG. 1 is a partial vertical elevational view of an upright with a beam.
Figure 2:
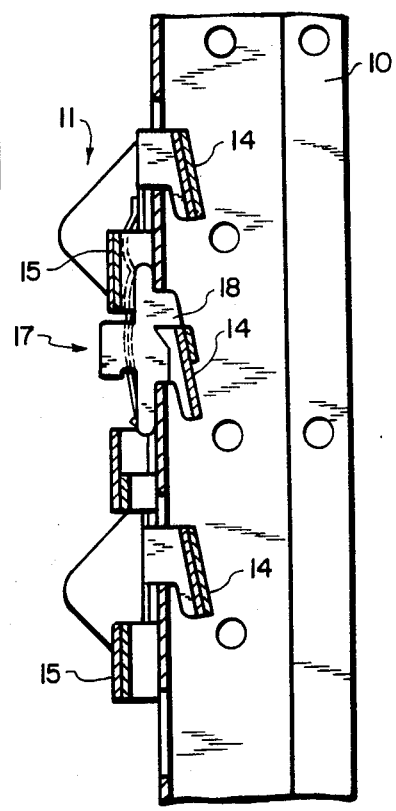
FIG. 2 is a partial vertical sectional view taken on the line II—II of FIG. 1, and FIGS. 3–5 are enlarged vertical sectional views taken through beam and upright in the area of the lock device.

Refferring to FIG. 1 which shows an upright 10 supporting a beam 11 of a profiled metal sheet. The beam is I-shaped in cross section and has a load surface 12. The ends of the beam have a flat part 13 from which portions project alternately to one and the other side of the beam, respectively. These portions are U-shaped in cross section and are made by the deformation of the flat part. The portions projecting to one side of the beam are formed as hooks 14 whereas the portions or deformations projecting to the other side of the beam form grooves 15 which extend vertically.

The upright 10 has two rows of holes 16, each hole having side walls which converge downwardly.

In each end, the beam has a lock means including a lock device 17. This device has a member 18 whose outer part is shaped as a nose and is meant to fall into a hole 16 between the upper edge of the hole and the upper part of a hook 14. The lock device also has a first, generally vertical stop surface 19 to co-act with an area 20 below the lower edge of a hole 16. The lock device has a lower projection 21 which through a second, horizontal stop surface 22 merges into the first stop surface 19. Furthermore, the lock device has a grip 23 and an upper projection 24. The lock device is fastened to the beam in such a manner that the upper and the lower projection, respectively, lie in two adjacent grooves 15 at the end of the beam.

The lock device 17 is urged by a spring 25 in the direction to a hook 14. The spring is a double leaf spring, one leaf 26 being shaped as a frame and having a point of action situated at 27 at the lower projection, while the other leaf 28 is shaped as a lug and has a point of action 29 situated at the level of the member 18.

The leaf spring 28 has a vertical slot 30 through which the grip 23 of the lock device projects.

The upper end of the spring 25 abuts the beam at 31 and its central part is in the shape of a stub 32 abutting the interior surface of the groove 15.

Figure 3:
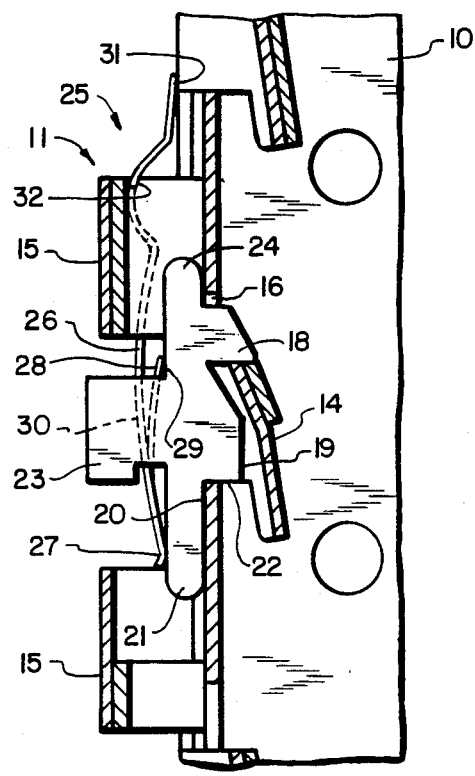
Figure 4:
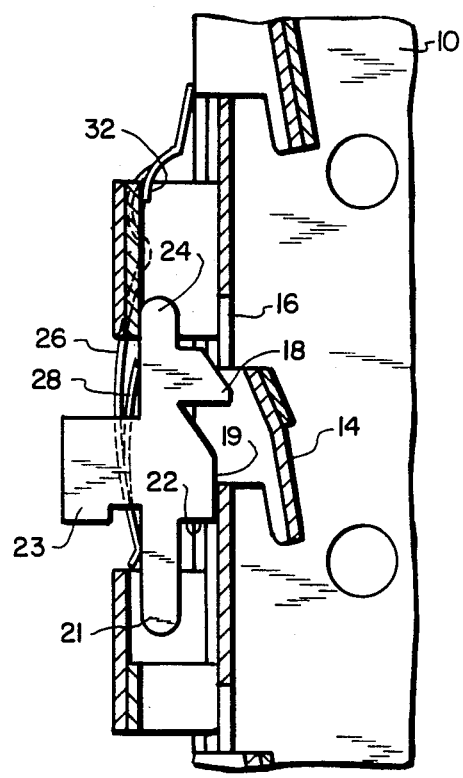
Figure 5:
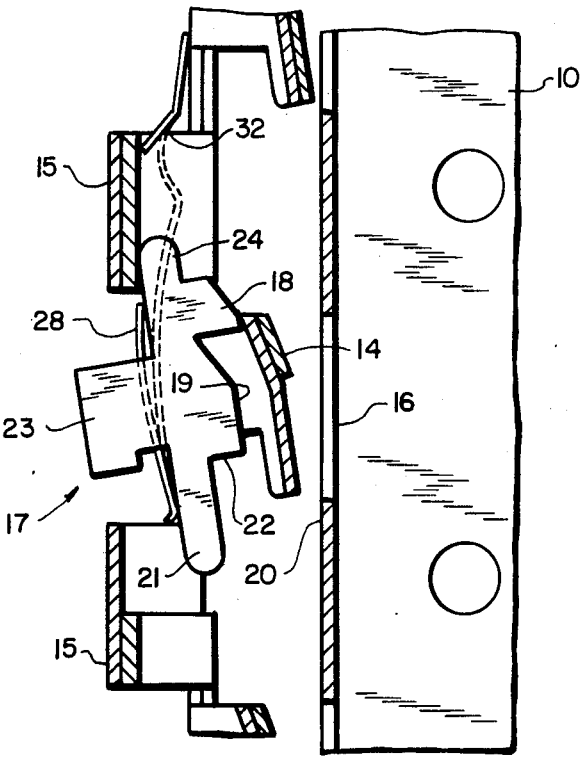

The device operates in the following manner:

FIG. 3 shows the beam in mounted position on the upright. This means that the member 18 is inserted between the upper part of the hook 14 and the edge of the hole and locks the beam against movement in the vertical direction. To release the beam the grip 23 is used to pull the lock device 17 to the left in the Figure against the action of the spring 25. Then the grip, and hence the lock device, is moved vertically downwards. The first stop surface 19 passes over the edge of the hole and is brought to abut the area 20 of the upright 10. This is accomplished at both ends of the beam. Then the beam is lifted so that the engagement of the first stop surface 19 with the upright 10 ceases and this surface under the action of the spring 25 snaps into the position shown in FIG. 5. In this position the outer end of the member 18 abuts the inside of the hook 14 and the lower projection 21 projects out of the flat part 13 of the beam.

Thereafter, the beam can be stored for later use, or be placed at another desired place. By means of the hooks of the beam being pushed into an upright the lower projection 21 of the lock device will turn to the left in FIG. 5, with the lower edge of the hole thus coming into contact with the second stop surface 22. Depression of the beam results in the lock element 17 being acted upon in the direction upwards so that the member will again assume a position above the hook 14 and by the aid of the spring 25 will snap into the beam and lock it.

On some occasions the lock device will be acted upon by exterior forces when the beam has been released and the member will be moved to a position above the hook. However, this does not alter the function of the device because it only means that the member upon mounting of the beam is automatically brought back when the hook of the beam is moved into the hole of the upright. However, when the beam is depressed the member will be moved to the position shown in FIG. 3.

I claim:

1. A device for locking a beam to an upright having spaced holes therein such as in a pallet rack, said beam being provided with at least one hook adapted to be inserted through any of said holes in the upright, and a spring-biased lock device having locking means which in a locking position is inserted in the free space above the hook in said hole, said lock device being provided with a member by which it can be moved manually against the action of a spring to an extracted position, so that a first surface of the lock device, at least initially during a lifting movement performed when the beam is to be removed, is in engagement with said upright thereby retaining the device in the extracted position, said first surface being so constructed to disengage from said upright during continued lifting movement of the beam whereby said lock device under the action of said spring snaps into a prestressed position from which it by means of the upright is moved to said locking position when the beam is fastened to said upright.

2. A device as claimed in claim 1 further comprising a second surface which is provided on the lock device and which when said beam is being fastened to said upright by contact with said upright moves the lock device from the prestressed position in which a part of the lock device is resting on said beam to said locking position in which said part can be inserted in the free space formed in the holes of the beam when the hooks of the beam are engaged with said upright.

3. An arrangement according to claim 1 wherein said lock device has an outer projecting part which is shaped as a nose.

4. An arrangement as claimed in claim 1, further comprising spaced elongated holes in said upright wherein upon removal of said beam from said upright, said first surface is brought into engagement with that area of the upright which is immediately below said hole.

5. An arrangement as claimed in claim 1 wherein said lock device further comprises a lower projection, and said spring is a double leaf spring wherein the point of action of one spring is positioned against the lower projection whereas the point of action of the other spring is positioned adjacent to the upper part of said lock device.

6. An arrangement as claimed in claim 5 wherein said beam is provided with projecting deformations which are U-shaped in cross section, and into which said spring is fastened.

7. An arrangement as claimed in claim 6 wherein said lock device is further provided with an upper projection which together with said lower projection upon movement of said lock device to the unlocked position said projections are inserted in said U-shaped deformations forming grooves which limit the path of movement of said lock device.

* * * * *